(12) United States Patent
Reinheimer et al.

(10) Patent No.: US 7,118,725 B2
(45) Date of Patent: Oct. 10, 2006

(54) EXPANDABLE GRAPHITE INTERCALATION COMPOUNDS, METHOD FOR SYNTHESIZING THEM AND THEIR USE

(75) Inventors: Arne Reinheimer, Zellerberg (DE); Antje Wenzel, Wörthsee (DE)

(73) Assignee: Hilti Aktiengesellschaft, Schaan (LI)

( * ) Notice: Subject to any disclaimer, the term of this patent is extended or adjusted under 35 U.S.C. 154(b) by 618 days.

(21) Appl. No.: 10/319,275

(22) Filed: Dec. 13, 2002

(65) Prior Publication Data
US 2003/0157015 A1    Aug. 21, 2003

(30) Foreign Application Priority Data
Dec. 19, 2001    (DE)    ............... 101 62 532

(51) Int. Cl.
*C09C 1/46*    (2006.01)
*C09K 21/02*    (2006.01)
*C04B 20/00*    (2006.01)

(52) U.S. Cl. .................. 423/448; 423/460; 252/378 R; 252/606

(58) Field of Classification Search ................ 423/448
See application file for complete search history.

(56) References Cited

U.S. PATENT DOCUMENTS

| | | | |
|---|---|---|---|
| 3,880,944 A | 4/1975 | Lalancette | |
| 3,925,495 A | 12/1975 | Rodewald | |
| 3,984,352 A | 10/1976 | Rodewald | |
| 4,035,434 A | 7/1977 | Rodewald | |
| 4,083,885 A | 4/1978 | Rodewald | |
| 4,119,655 A | 10/1978 | Hulme | |
| 4,202,986 A | 5/1980 | Shawl | |
| 5,094,780 A | 3/1992 | Von Bonin | |
| 5,376,450 A * | 12/1994 | Greinke et al. | ............. 428/402 |
| 6,149,972 A * | 11/2000 | Greinke | ...................... 427/220 |
| 6,406,612 B1 * | 6/2002 | Greinke | ...................... 205/555 |
| 6,669,919 B1 * | 12/2003 | Greinke | ...................... 423/448 |

FOREIGN PATENT DOCUMENTS

| | | |
|---|---|---|
| CN | 1032325 | 4/1989 |
| EP | 0085121 | 1/1982 |
| EP | 0500359 | 8/1992 |
| GB | 2001662 | 2/1979 |
| KR | 9406238 B1 * | 7/1994 |

* cited by examiner

*Primary Examiner*—Stewart W. Hendrikson
*Assistant Examiner*—Alvin Raetzsch
(74) *Attorney, Agent, or Firm*—Abelman, Frayne & Schwab

(57) ABSTRACT

Expandable graphic intercalatable compounds with controllable onset temperatures, methods for their synthesis and their use as intumescing, fire-protection additives for the preparation of flame-retardant compositions.

18 Claims, 1 Drawing Sheet

Figure 1:
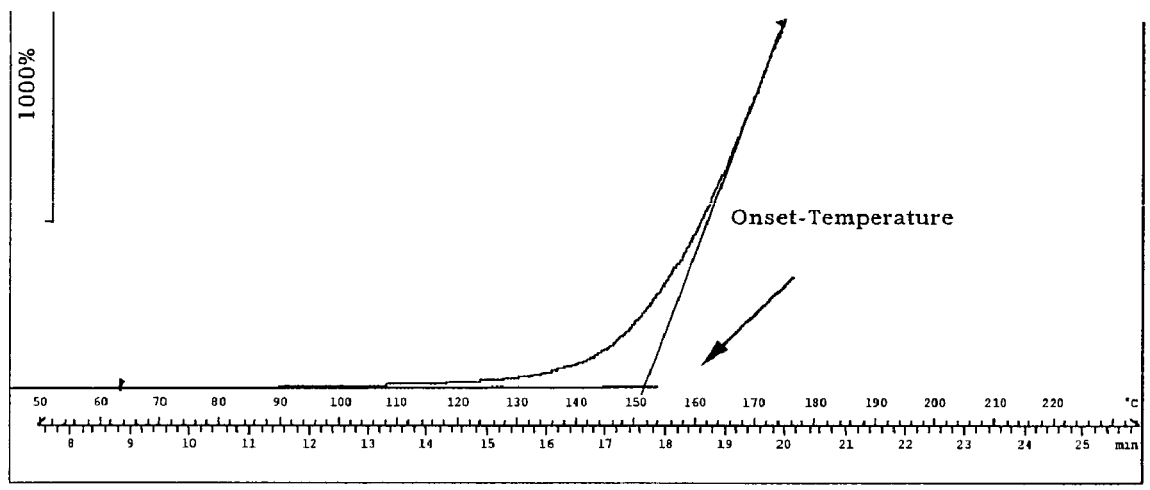

EXPANDABLE GRAPHITE INTERCALATION COMPOUNDS, METHOD FOR SYNTHESIZING THEM AND THEIR USE

FIELD OF INVENTION

The object of the invention are expandable graphite intercalation compounds with a controllable onset temperature, methods for their synthesis and their use as intumescing fire-protection additives for the production of flame-retardant compositions, especially intumescing compositions for sealing through holes, wall bushings and other openings in walls, floors and/or ceiling of buildings as fire protection.

BACKGROUND INFORMATION AND PRIOR ACT

Expandable graphite intercalation compounds are also known as expanding graphite and are commercially available. They are compounds, which contain foreign components intercalated between the lattice layers of the graphite. Such expandable graphite intercalation compounds usually are prepared by dispersing graphite particles in a solution, which contains an oxidizing agent and a guest compound, which is to be intercalated. Usually, nitric acid, potassium chlorate, chromic acid, potassium permanganate and the like are used as oxidizing agent. Concentrated sulfuric acid, for example, is used as compound, which is to be intercalated, the reaction taking place at temperatures of 60° C. to 130° C. during a period of up to four hours (see, for example, EP-B-0 085 121). Alternatively, it is also possible to intercalate metal chlorides in the graphite in the presence of, for example, chlorine gas (E. Stumpp. Physics (1981, 9–16).

The expandable graphite intercalation compounds or expanding graphites experience a large increase in volume when heated to a temperature above the so-called onset temperature. The expansion factor is more than 200 and is caused owing to the fact that the intercalation compounds, intercalated in the layer structure of the graphite, are decomposed by the rapid heating to this temperature with formation of gaseous materials, as a result of which the graphite particles are expanded perpendicularly to the plane of the layers (EP-B-0 085 121). This expansion behavior is utilized in intumescing compositions, which are used, for example, for sealing cable and pipe wall bushings through walls and ceilings of buildings as fire protection. In the event of a fire, after the onset temperature has been reached, the graphite particles and, with that, the intumescing composition sealing the wall bushings, expand so that, in even after the cable and/or the plastic pipes, passed through the wall bushings, have been burned completely, the fire is prevented or delayed from breaking through the wall bushing.

The onset temperature is defined as the temperature, at which the thermal expansion process of the intumescing system, that is, of the expandable graphite intercalation compound, commences. In other words, it is the temperature at the start of the expansion process. The conventional, commercially obtainable types of expanding graphite have very limited onset temperatures of about 150° C., about 160° C. and about 200° C. In order to be able to react flexibly to special product requirements with respect to the intumescing behavior for the production of fire-protection compositions, expandable, graphite intercalation compounds are required which have a greater range of variation with regard to their onset temperature.

OBJECT OF THE INVENTION

It is an object of the present invention to provide expandable graphite intercalation compounds, the onset temperatures of which can be adjusted selectively within a wide range.

SUMMARY OF THE INVENTION

Surprisingly, it has turned out that, by the co-intercalation of intercalatable Lewis acids, which are also referred to as acceptors, and intercalatable organic compounds, which are also referred to as Lewis bases or donors, that is, by the introduction of an intercalatable Lewis acid as well as of an organic compound, it becomes possible, depending on the intercalation compounds intercalated in the graphite, to achieve or adjust onset temperature selectively in the range from 44° C. to 233° C.

The above objective is therefore accomplished by the expandable graphite intercalation compounds of claim 1. The depending claims relate to preferred embodiments of this inventive object of methods for producing these graphite intercalation compounds and of their use.

The object of the invention therefore are expandable graphite intercalation compounds with controllable onset temperatures, wherein the compounds, as intercalation components, contain at least one intercalatable Lewis acid, which is present optionally in combination with the solvent or solvents, especially nitromethane, used for the synthesis, and at least one organic compound. Pursuant to the invention, the onset temperature can be controlled by the nature of these intercalates, namely the organic compound.

Pursuant to the invention, preferably a metal halide, especially a metal chloride such as $AlCl_3$, $SbCl_5$, $ZnCl_2$, $YCl_3$, $CrCl_3$, $NiCl_2$ and/or $FeCl_3$ is used as intercalatable Lewis acid.

As organic compound, the graphite intercalation compounds preferably contain compounds from the group comprising carboxylic acid halides, dicarboxylic acid dihalides, alkyl halides, aryl halides, alkylaryl halides, arylalkyl halides, aliphatic or aromatic alcohols, dialkyl ethers, diaryl ethers, arylalkyl ethers, aliphatic or aromatic glycol ethers, carboxylate esters, dicarboxylate esters, alkenes, 1,3-diketones and organic complexing agents.

Carboxylic acid halides, preferred pursuant to the invention, correspond to the general Formula (I):

(I)

in which R is hydrogen or an alkyl, alkenyl, aryl, arylalkyl or alkylaryl group with 1 to 30 and preferably 1 to 18 carbon atoms and X represents a halogen atom, preferably a chlorine or bromine atom. Acetyl chloride, hexanoyl chloride, octanoyl chloride, palmitoyl chloride, benzoyl chloride, phenylacetyl chloride, 3-phenylpropionyl chloride and pivalic acid chloride are particularly preferred carboxylic acid halides.

Dicarboxylic acid dihalides, preferred pursuant to the invention, correspond to the general Formula (II)

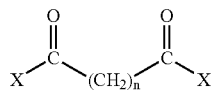 (II)

in which n represents a whole number from 1 to 30 and preferably 1 to 18 and X represents a halogen atom, preferably a chlorine or a bromine atom. Pursuant to the invention, oxalyl chloride, malonic acid dichloride, succinic acid dichloride, glutaric acid dichloride and adipic acid dichloride are particularly preferred dicarboxylic acid dichlorides.

The inventive graphite intercalation compounds preferably contain aryl halides, arylalkyl halides or alkylaryl halides of the general Formula (III) as alkyl halides:

 (III)

in which R represents an alkyl, alkenyl, aryl, arylalkyl or alkylaryl group with 1 to 30 and preferably 1 to 18 carbon atoms and X represents a halogen atom, preferably a chlorine or bromine atom. Phenyl chloroformate, 2-phenoxyethyl chloride and 2-phenylethyl chloride are preferred representatives of these halogen compounds.

In accordance with a further, preferred embodiment, the inventive graphite intercalation compounds contain a compound of the general formula (IV)

 (IV)

as aliphatic and aromatic alcohol, in which R represents an alkyl, alkenyl, aryl, arylalkyl or alkylaryl group with 1 to 30 and preferably 1 to 18 carbon atoms. Alcohols, which are particularly preferred pursuant to the invention, are methanol, ethanol, 1,3-propylene glycol, 1,4-butylene glycol and benzyl alcohol.

Dialkyl or diaryl ethers, preferred pursuant to the invention, correspond to the general formula (V):

 (V)

in which R, independently of one another, represent alkyl, alkenyl, aryl, arylalkyl or alkylaryl groups with 1 to 30 and preferably 1 to 18 carbon atoms. Diethyl ether and diphenyl ethers are preferred representatives of this group.

In accordance with a further preferred embodiment of the invention, the graphite intercalation compounds contain aliphatic and aromatic glycol ethers of the general formula (VI) as organic compound:

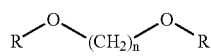 (VI)

in which n is a whole number with a value of 1 to 30 and preferably of 1 to 18 and R, independently of one another, represent alkyl, alkenyl, aryl, arylalkyl or alkylaryl groups with 1 to 30 and preferably 1 to 18 carbon atoms. Ethylene glycol dimethyl ether is a particularly preferred representative of this group.

As carboxylate esters, inventive compounds of the general formula (VII) are preferred:

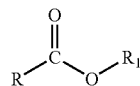 (VII)

in which R represents hydrogen or an alkyl, alkenyl, aryl, arylalkyl or alkylaryl groups with 1 to 30 and preferably 1 to 18 carbon atoms and $R_1$ represents an alkyl group with 1 to 8 and preferably with 1 to 6 carbon atoms. Ethyl acetate is a particularly preferred representative of this group.

Furthermore, pursuant to the invention, dicarboxylate esters of Formula (VIII) can also be intercalated as organic compound in the graphite:

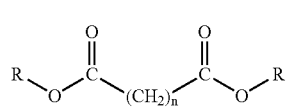 (VIII)

in which n is a whole number with a value of 1 to 30 and preferably of 1 to 18 and R, independently of one another, represent alkyl, alkenyl, aryl, arylalkyl or alkylaryl groups with 1 to 30 and preferably 1 to 18 carbon atoms.

As alkenes, particularly the compounds of the general Formula (IX) are preferred

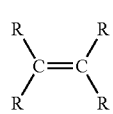 (IX)

in which R, independently of one another, represent alkyl, alkenyl, aryl, arylalkyl or alkylaryl groups with 1 to 30 and preferably 1 to 18 carbon atoms. Pursuant to the invention, the use of styrene is preferred.

1,3-Diketones, preferred pursuant to the invention, correspond to the general Formula (X):

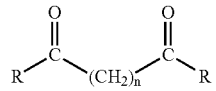 (X)

in which n represents a whole number with a value of 1 to 30 and preferably of 1 to 18 and R, independently of one another, represents alkyl, alkenyl, aryl, arylalkyl or alkylaryl groups with 1 to 30 and preferably 1 to 18 carbon atoms.

Pursuant to the invention, preferably ethylenediaminetetraacetic acid, nitrilomethanephosphonic acid, pentasodium triphosphate and/or triethanolamine are intercalated as organic complexing agents in the graphite particles.

The alkyl and alkenyl groups, addressed in the above R and $R_1$ groups, contain 1 to 30, preferably 1 to 18 and particularly 1 to 8 carbon atoms. Phenyl and naphthyl are the preferred aryl groups, while the benzyl group is the preferred arylalkyl group.

The invention furthermore relates to a method for the preparation of the above-defined graphite intercalation compounds by the co-intercalation of the intercalatable metal chlorides and the organic compounds or by the subsequent intercalation of the organic compounds in the intermediate intercalation compounds, obtained by intercalating intercalatable Lewis acid in the graphite.

A preferred inventive method consists of reacting graphite and the intercalatable Lewis acid in a sealed tube or in a solvent suitable for this purpose and then, optionally after prior isolation, purification and drying, reacting the intermediate intercalation compound obtained from graphite and Lewis acid with the organic compound and isolating, purifying and drying the reaction product.

For this method, the first step of the reaction of graphite and the intercalatable Lewis acid can be carried out either in a sealed tube, that is, the graphite and the intercalatable Lewis acid are melted and reacted in a quartz tube, or in a solvent suitable for this purpose.

Even though the reaction in a solvent is advantageous, since it can be carried out at temperatures lower than that required for the solid reaction of the metal chloride with the graphite in a fused quartz tube, there are appreciable limitations with respect to the solvent to be used, which namely must dissolve the metal chloride as well as make possible, directly or indirectly, the electron transfer between the graphite and the metal chloride. Solvents, which can be used for this purpose, are, for example, nitroalkanes of the general formula $CH_3(CH_2)_nNO_2$, in which n is a number with a value of 0 to 10, as well as their structural isomers, especially nitromethane, nitroethane, 1-nitropropane, carbon tetrachloride and thionyl chloride.

In the event that solvents are used, they are contained in the intermediate intercalation compound obtained from graphite and Lewis acid. This intermediate product may optionally be isolated, purified and dried, the purification being accomplished, for example, by washing the intermediate with a solvent and then drying it.

The reaction of graphite and the intercalatable Lewis acid in a sealed tube is carried out preferably at a temperature of 200° C. to 800° C. and particularly of 250° C. to 600° C. for a period of 3 minutes to 72 hours, preferably of 10 to 24 hours and especially of 12 to 18 hours.

Thereupon, the intermediate intercalation compound of graphite and Lewis acid is reacted with the organic compound, the latter being reacted in liquid or molten form or in a solvent suitable for this purpose.

Pursuant to a further embodiment of the invention, the intercalatable Lewis acid and the organic compounds are intercalated simultaneously, that is, by co-intercalation. For this procedure, the graphite, the intercalatable Lewis acid and the organic compound are reacted simultaneously either in the organic compound in liquid or molten form or in a solvent suitable for the reaction. The solvent used must dissolve the metal chloride and the organic compound and must make possible an electron transfer between the graphite and the metal chloride and organic compound, which are to be intercalated.

After the reaction, the product finally obtained is isolated and purified in the usual manner, for example, by washing with the solvent, and dried.

The inventive intercalation of the organic compound takes place either in the intercalation intermediate, which is obtained initially and contains graphite, the intercalatable Lewis acid and optionally a solvent, preferably nitromethane, or within the scope of the co-intercalation, preferably by reacting the reactants, optionally in a solvent, at a temperature ranging from −10° C. to 100° C. and preferably at a temperature of 10° C. to 50° C. and particularly at room temperature for a period of three minutes to 48 hours and preferably of 30 minutes to 24 hours.

For the reaction, the intercalatable Lewis acid is used preferably in an amount of 0.02 to 20 moles and preferably of 0.05 to 10 moles per mole of graphite, whereas the organic compound is used in an amount of 0.75 to 1000 percent by weight and preferably of 2 to 800 percent by weight, based on the sum of the graphite and the Lewis acid or on the weight of the intermediate intercalation compound of graphite and Lewis acid and optionally intercalated solvent, preferably nitromethane.

A further object of the invention is the use of the above-described graphite intercalation compound as expanding graphite as intumescing fire-protection additive for the production of flame retardant compositions, especially for the production of intumescing compositions for sealing through holes, wall bushings and other openings in walls, floors and/or ceiling of buildings as fire protection.

The above-addressed onset temperature of the inventive graphite intercalation compounds, given in the following examples, is measured by the thermomechanical analysis of the dimensional change of the material as a function of the temperature. For this purpose, a sample is placed on a sample holder, which is provided with a measuring probe, and placed in an oven, which, using a suitable temperature program, is heated within a previously determined temperature range. In addition, the measurement probe may be acted upon with a variable load. For this measurement, a positive dimensional change is referred to as expansion and a negative dimensional change as shrinkage.

To determine the expansion of the inventive graphite intercalation compounds, a powdery sample is added to a corundum crucible and covered with a steel crucible. If the sample expands, the steel crucible ensures the smooth transfer of dimensional changes of the sample to the measurement probe. This crucible arrangement is placed on the sample carrier of the thermomechanical analysis apparatus and introduced into the oven.

As a result of such a thermomechanical analysis, a curve is obtained, which is shown in FIG. 1 and in which the percentage expansion of the material is plotted as the linear displacement of the steel crucible as a function of the temperature.

The onset temperature of the intumescing material is defined mathematically as the intersection of the extended baseline before the expansion of the sample and the tangent at the point of inflection of the expansion curve.

The following conditions were maintained for determining the onset temperature:

| | |
|---|---|
| Temperature program: | Dynamic mode with prior isothermal phase for 5 minutes at 25° C. |
| Heating rate: | 10° C./min |
| Temperature range: | 25° C. to 500° C. (sometimes also 25° C. to 1100° C.) |
| Analysis gas: | Synthetic air |
| Flow rate: | 50 mL/min |
| Load: | 0.06 N |
| Sample vessel: | 150 µL corundum crucible + 150 µL steel crucible (as lid) |

The following examples are intended to explain the invention in greater detail.

EXAMPLE 1

Preparation of the FeCl₃-Graphite Intermediate Intercalation Compound in Nitromethane (FeCl₃/CH₃NO₂-graphite)

FeCl₃ (11.68 g, 0.07 moles) is dissolved in 15 mL of nitromethane in a 100 mL round-bottom flask. Subsequently, 5 g (0.42 moles) of graphite are added and the mixture is stirred for 18 hours at room temperature. The material is washed with nitromethane as solvent, filtered off with suction and dried.

The intermediate obtained contains FeCl₃ and nitromethane as intercalates and has an onset temperature of 148° C.

EXAMPLE 2

Preparation of the FeCl₃-Graphite Intermediate Intercalation Compound by a Solid Reaction Graphite (2.25 g, 0.19 moles) is mixed with 2.25 g (0.01 moles) of FeCl₃ and the mixture is melted in a quartz glass tube. Subsequently, the reaction mixture, melted in the quartz glass tube, is kept for 17 hours at 300° C. It is then cooled, washed with a little water, filtered with suction and dried.

The onset temperature of this intermediate is 314° C.

EXAMPLE 3

Intercalation of an organic compound in the FeCl₃/CH₃NO₂-graphite intermediate intercalation compound The FeCl₃/CH₃NO₂-graphite intermediate intercalation compound (1 g, 84 mmoles), obtained in Example 1, is stirred for 24 hours at room temperature in 3 mL (0.03 moles) of propionyl chloride. Subsequently, the material is filtered off with suction, washed with a little diethyl ether and dried.

The onset temperature of the product is 132° C.

EXAMPLE 4

Intercalation of an organic compound in the FeCl₃-Graphite Intermediate Intercalation Compound The FeCl₃-graphite intermediate intercalation compound (0.5 g, 42 mmoles), obtained in Example 2, is stirred for 24 hours at room temperature in 3 mL (0.03 moles) of propionyl chloride. Subsequently, the material is filter off with suction, washed with a little diethyl ether and dried.

The onset temperature of the product is 152° C.

EXAMPLE 5

The procedure of Example 3 is repeated using the FeCl₃/CH₃NO₂-graphite intermediate intercalation compound of example 1 and the organic compounds, given in the following Table 1. Products are obtained with the onset temperatures, given in the same Table.

TABLE 1

| Organic Compound | Onset Temperature (° C.) |
| --- | --- |
| Oxalyl chloride | 44 |
| Malonyl dichloride | 114 |
| Succinyl dichloride | 150 |
| Glutaryl dichloride | 133 |
| Adipyl dichloride | 138 |
| Acetyl chloride | 114 |
| Propionyl chloride | 132 |
| Hexanoyl chloride | 154 |
| Octanoyl chloride | 156 |
| Palmitoyl chloride | 146 |
| Benzoyl chloride | 150 |
| Phenylacetyl chloride | 157 |
| 3-Phenylpropionyl chloride | 153 |
| Pivalinyl chloride | 150 |
| Acrylyl chloride | 156 |
| Methanol | 152 |
| Ethanol | 152 |
| 1,3-Propylene glycol | 152 |
| 1,4-Butylene glycol | 134 |
| Benzyl alcohol | 129 |
| Phenyl chloroformate | 159 |
| 2-Phenoxyacetyl chloride | 156 |
| 2-Phenylethyk chloride | 159 |
| Ethyl acetate | 155 |
| Diethyl ether | 153 |
| Ethylene glycol dimethyl ether | 158 |
| Diphenyl ether | 156 |
| Styrene | 139 |
| Acetoacetate | 140 |
| Acetylacetone | 154 |
| Benzoylacetone | 155 |
| EDTA | 156 |
| Nitrilotrimethanephosphonic acid | 155 |
| Pentasodium triphosphate | 159 |
| Triethanolamine | 156 |

It can be readily seen from Table 1 that the onset temperature of the expandable graphite intercalation compound obtained can be selectively controlled from 44° C. to 159° C. by the appropriate selection of the organic compound used.

EXAMPLE 6

The procedure of Example 4 is repeated, using the FeCl₃-graphite intermediate intercalation compound of Example 2 and the compounds given in the following Table II, in which the onset temperatures of the products obtained are also listed.

TABLE 2

| Organic Compound | Onset Temperature (° C.) |
| --- | --- |
| Acetyl chloride | 172 |
| Hexanoyl chloride | 167 |
| Octanoyl chloride | 157 |
| Palmitoyl chloride | 144 |
| Benzoyl chloride | 147 |
| Phenylacetyl chloride | 118 |
| 3-Phenylpropionyl chloride | 137 |
| Pivalinic acid chloride | 100 |
| Oxalyl chloride | 57 |
| Malonic acid dichloride | 106 |
| Succinic acid dichloride | 173 |
| Glutaric acid dichloride | 147 |
| Adipic acid dichloride | 146 |
| Methanol | 124 |
| Ethanol | 164 |
| 1,3-Propylene glycol | 171 |
| 1,4-Butylene glycol | 187 |
| Benzyl alcohol | 159 |

TABLE 2-continued

| Organic Compound | Onset Temperature (° C.) |
|---|---|
| Phenyl chloroformate | 164 |
| 2-Phenoxyethyl chloride | 233 |
| 2-Phenylethyl chloride | 142 |
| Ethyl acetate | 153 |
| Diethyl ether | 174 |
| Ethylene glycol dimethyl ether | 133 |
| Diphenyl ether | 150 |
| Ethyl acetate | 151 |
| Acetyleacetone | 169 |
| Benzylacetone | 158 |
| EDTA | 120 |
| Nitrilotrimethane phosphonic acid | 139 |
| Pentasodium triphosphate | 205 |
| Triethanolamine | 164 |

It can be readily seen from the above Table that the onset temperature of the expandable graphite intercalation compound obtained can be selectively controlled from 57° C. to 233° C. by the appropriate selection of the organic compound used.

The invention claimed is:

1. An expandable graphite intercalation compound with controllable expansion onset temperatures, wherein contained, as intercalation components, are at least one intercalatable Lewis acid, optionally in combination with a solvent or solvents, and at least one organic compound, wherein the at least one organic compound is selected from the group consisting of carboxylic acid halides, dicarboxylic acid dihalides, alkyl halides, aryl halides, alkylaryl halides, arylalkyl halide, dialkyl ethers, diaryl ethers, arylalkyl ethers, aliphatic or aromatic glycol ethers, 1,3-diketones, ethylenediaminetetraacetic acid, nitrilotriacetic acid, diethylenetriaminepentaacetic acid, nitrilomethanephosphoric acid, pentasodium triphosphate, and triethanolamine.

2. The graphite intercalation compounds of claim 1, wherein a metal halide is contained as an intercalatable Lewis acid.

3. The graphite intercalation compounds of claim 2, wherein a metal chloride is contained as an intercalatable metal halide.

4. The graphite intercalation compounds of claim 3, herein $AlCl_3$, $SbCl_5$, $ZnCl_2$, $YCl_3$, $CrCl_3$, $NiCl_2$ and/or $FeCl_3$ are contained as intercalatable metal chloride.

5. The graphite intercalation compounds of claim 1, wherein a compound of the general Formula (I)

(I)

is contained as carboxylic acid halide, in which R is hydrogen or an alkyl, aryl, arylalkyl or alkylaryl group with 1 to 30 and preferably 1 to 18 carbon atoms and X represents a halogen atom, preferably a chlorine or bromine atom.

6. The graphite intercalation compounds of claim 1, wherein a compound of the general Formula (II)

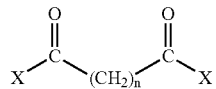

(II)

is contained as dicarboxylic acid dihalide, in which n is a whole number from 1 to 30 and preferably from 1 to 18 and X is a halogen atom, preferably a chlorine or bromine atom.

7. The graphite intercalation compounds of claim 1, wherein a compound of the general Formula (III)

R—X    (III)

is contained as alkyl halide, aryl halide, arylalkyl halide or alkylaryl halide, in which R represents an alkyl, aryl, arylalkyl or alkylaryl group with 1 to 30 and preferably 1 to 18 carbon atoms and X a halogen atom, preferably a chlorine or bromine atom.

8. The graphite intercalation compounds of claim 1, wherein a compound of the general Formula (V)

(V)

is contained as diakyl ether, diaryl ether or arylalkyl ether, in which R, independently of one another, represent alkyl, aryl, arylalkyl or alkylaryl groups with 1 to 30 and preferably 1 to 18 carbon atoms.

9. The graphite intercalation compounds of claim 1, wherein a compound of the general Formula (VI)

(VI)

is contained as aliphatic or aromatic glycol ether, in which n represents a whole number from 1 to 30 and preferably from 1 to 18 and R, independently of one another, represent alkyl, aryl, arylalkyl or alkylaryl groups with 1 to 30 and preferably 1 to 18 carbon atoms.

10. The graphite intercalation compounds of claim 1, wherein a compound of the general Formula (X)

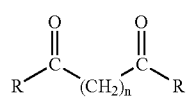

(X)

is contained as 1,3-diketone, in which n is a whole number from 1 to 30 and preferably from 1 to 18 and R, independently of one another, represent alkyl, aryl, arylalkyl or alkylaryl groups with 1 to 30 and preferably 1 to 18 carbon atoms.

11. A method for the synthesis of expandable graphite intercalation compounds with controllable expansion onset temperatures, wherein contained, as intercalation components, are at least one intercalatable Lewis acid, optionally in combination with a solvent or solvents, and at least one organic compound, wherein the at least one organic compound is selected from the group consisting of carboxylic acid halides, dicarboxylic acid dihalides, alkyl halides, aryl halides, alkylaryl halides, arylalkyl halide, dialkyl ethers, diaryl ethers, arylalkyl ethers, aliphatic or aromatic glycol ethers, 1,3-diketones, ethylenediaminetetraacetic acid, nitrilotriacetic acid, diethylenetriaminepentaacetic acid, nitrilomethanephosphoric acid, pentasodium triphosphate, and triethanolamine, the method comprising the step of carrying out a reaction of graphite and intercalatable Lewis acid in a sealed tube or in a solvent suitable for reaction, whereby an intercalation compound of graphite and the Lewis acid then obtained, optionally after prior isolation, purification and drying, is reacted with the organic compound and the reaction product is isolated, purified and dried.

12. The method of claim 11, wherein the intercalation compound of graphite and Lewis acid, obtained in the first step, is reacted with a liquid or molten organic compound or in a solvent suitable for this purpose.

13. The method of claim 11, wherein purification is carried out by washing with a solvent.

14. The method of claim 11, wherein a nitroalkane of a general Formula $CH_3(CH_2)_nNO_2$, in which n is a whole number from 0 to 10, and its structural isomers, especially nitromethane, nitroethane, 1-nitropropane, carbon tetra chloride and/or thionyl chloride, is used as solvent.

15. The method of claim 11, wherein the reaction is carried out at a temperature of −10° to 100° C. and preferably of 10° to 50° C. for 3 minutes to 48 hours and preferably 5 minutes to 24 hours.

16. The method of claim 11, wherein the Lewis acid is used in an amount of 0.02 to 20 moles and preferably of 0.05 to 10 moles per mole of graphite.

17. The method of claim 11, wherein the organic compound is used in an amount of 0.75 to 1000% by weight and preferably of 2 to 800% by weight, based on the intercalation compound of graphite and Lewis acid and optionally of intercalated nitromethane.

18. The method of synthesizing expandable graphite intercalation compounds with controllable expansion onset temperatures, wherein contained, as intercalation components, are at least one intercalatable Lewis acid, optionally in combination with a solvent or solvents, and at least one organic compound, wherein the at least one organic compound is selected from the group consisting of carboxylic acid halides, dicarboxylic acid dihalides, alkyl halides, aryl halides, alkylaryl halides, arylalkyl halide, dialkyl ethers, diaryl ethers, arylalkyl ethers, aliphatic or aromatic glycol ethers, 1,3-diketones, ethylenediaminetetraacetic acid, nitrilotriacetic acid, diethylenetriaminepentaacetic acid, nitrilomethanephosphoric acid, pentasodium triphosphate, and triethanolamine, the method comprising the step of carrying out a reaction of graphite, intercalatable Lewis acid, and the organic compound in a in a liquid or molten organic compound or in a solvent suitable for this purpose, and isolating, purifying and drying of the reacted product.

* * * * *